US012579047B2

(12) United States Patent
Roweth et al.

(10) Patent No.: US 12,579,047 B2
(45) Date of Patent: Mar. 17, 2026

(54) TRACKING APPLICATION BEHAVIOR BASED ON PACKET SPACING

(71) Applicant: Hewlett Packard Enterprise Development LP, Spring, TX (US)

(72) Inventors: Duncan Roweth, Bristol (GB); Anthony M. Ford, Bristol (GB); Jonathan P. Beecroft, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 55 days.

(21) Appl. No.: 18/786,142

(22) Filed: Jul. 26, 2024

(65) Prior Publication Data

US 2026/0030132 A1 Jan. 29, 2026

(51) Int. Cl.
*G06F 11/34* (2006.01)
*H04L 43/0876* (2022.01)
*H04L 67/50* (2022.01)

(52) U.S. Cl.
CPC ...... *G06F 11/3423* (2013.01); *H04L 43/0876* (2013.01); *H04L 67/535* (2022.05)

(58) Field of Classification Search
CPC . G06F 11/3423; H04L 67/535; H04L 43/0876
See application file for complete search history.

(56) References Cited

U.S. PATENT DOCUMENTS

| | | | | |
|---|---|---|---|---|
| 11,165,676 B1 * | 11/2021 | Gandhi | ................. | H04L 43/20 |
| 2009/0112899 A1 * | 4/2009 | Johnson | ........... | H04N 21/44224 |
| 2011/0225288 A1 * | 9/2011 | Easterday | ............. | G06F 16/217 |
| | | | | 709/224 |
| 2011/0291748 A1 * | 12/2011 | Li | .......................... | G06F 1/3287 |
| | | | | 327/544 |
| 2016/0352760 A1 * | 12/2016 | Mrkos | ................... | H04W 12/37 |
| 2020/0394073 A1 * | 12/2020 | Dutta | .................... | G06F 9/5011 |
| 2022/0400070 A1 * | 12/2022 | Jain | ...................... | H04L 43/062 |
| 2024/0380636 A1 * | 11/2024 | Kazimirsky | .......... | G06F 1/3209 |

* cited by examiner

*Primary Examiner* — Chris Parry
*Assistant Examiner* — Abderrahmen Chouat
(74) *Attorney, Agent, or Firm* — Yao Legal Services, Inc.

(57) ABSTRACT

A system tracks, in a network device with multiple links, activity over a respective link for a predetermined amount of time. The activity comprises at least one of a number of idle periods or a duration of a respective idle period. The system divides a predetermined time interval into a number of bins. A bin is associated with a range of time. The system stores the tracked activity in data structure entries which each indicate the number of bins, a duration of time associated with a respective bin, and a count associated with the respective bin. The system indicates the tracked activity in the entry for the respective link by incrementing a count associated with a bin matching the duration of the respective idle period based on a first number of idle periods tracked for the matching duration. The system displays the stored tracked activity for the respective link.

20 Claims, 11 Drawing Sheets

↗— 200

| | TOTAL NUMBER OF BINS 202 | BIN NUMBER 204 | BIN TIME DURATION / RANGE 206 | BIN COUNT 208 |
|---|---|---|---|---|
| 220 | 13 | 0 | < 1.0 microsecond (0-4 cycles) | 0 |
| 210 | 13 | 1 | 1.0-1.9 microseconds (5-9 cycles) | 4 |
| 212 | 13 | 2 | 2.0-2.9 microseconds (10-14 cycles) | 12 |
| | 13 | 3 | 3.0-3.9 microseconds (15-19 cycles) | 0 |
| 214 | 13 | 4 | 4.0-4.9 microseconds (20-24 cycles) | 3 |
| | 13 | 5 | 5.0-5.9 microseconds (25-29 cycles) | 0 |
| | 13 | 6 | 6.0-6.9 microseconds (30-34 cycles) | 0 |
| | 13 | 7 | 7.0-7.9 microseconds (35-39 cycles) | 0 |
| | 13 | 8 | 8.0-8.9 microseconds (40-44 cycles) | 0 |
| 216 | 13 | 9 | 9.0-9.9 microseconds (45-49 cycles) | 1 |
| | 13 | 10 | 10.0-10.9 microseconds (50-54 cycles) | 0 |
| | 13 | 11 | 11.0-11.9 microseconds (55-59 cycles) | 0 |
| 222 | 13 | 12 | >= 12.0 microseconds (>= 60 cycles) | 0 |

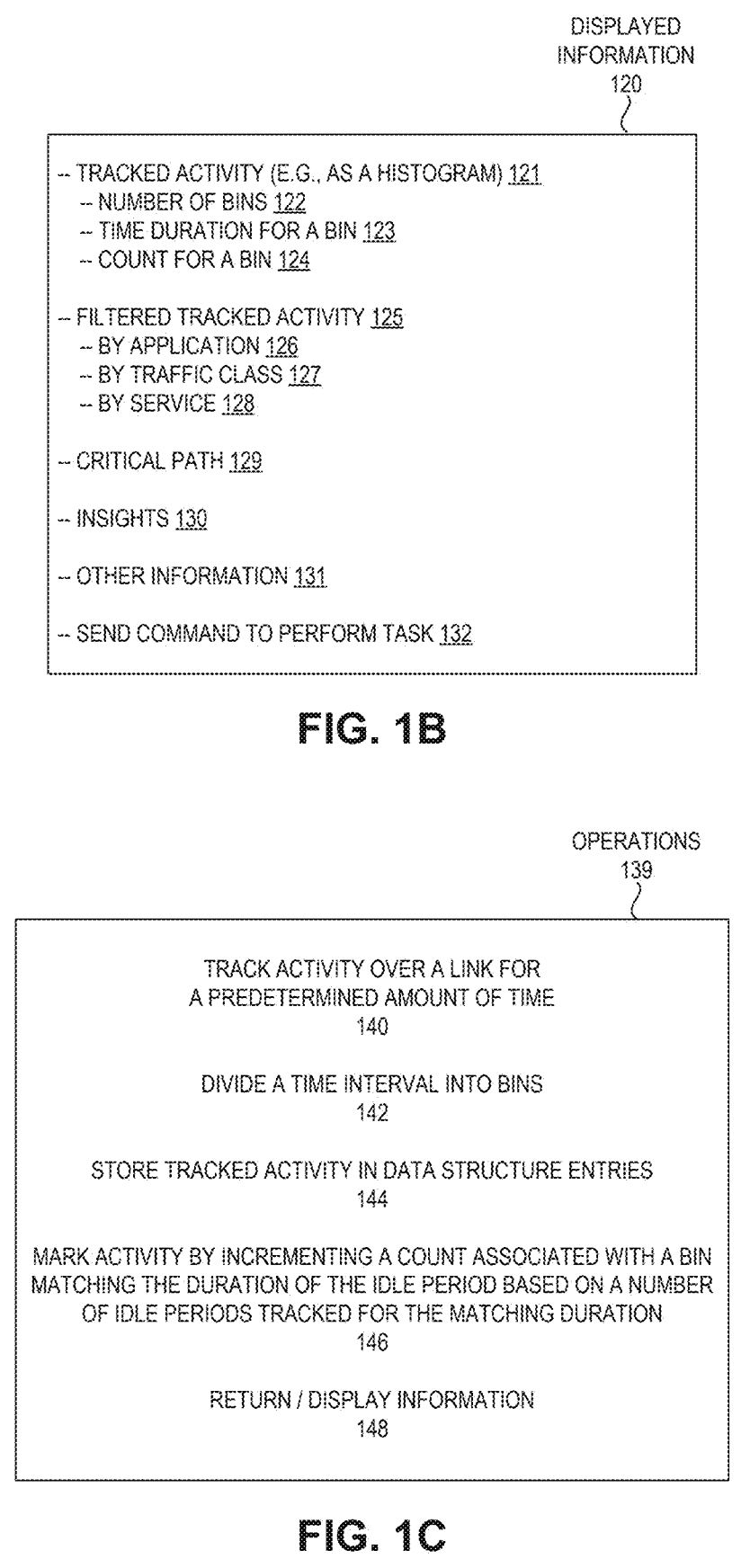

DISPLAYED
INFORMATION
120

-- TRACKED ACTIVITY (E.G., AS A HISTOGRAM) 121
    -- NUMBER OF BINS 122
    -- TIME DURATION FOR A BIN 123
    -- COUNT FOR A BIN 124

-- FILTERED TRACKED ACTIVITY 125
    -- BY APPLICATION 126
    -- BY TRAFFIC CLASS 127
    -- BY SERVICE 128

-- CRITICAL PATH 129

-- INSIGHTS 130

-- OTHER INFORMATION 131

-- SEND COMMAND TO PERFORM TASK 132

FIG. 1B

OPERATIONS
139

TRACK ACTIVITY OVER A LINK FOR
A PREDETERMINED AMOUNT OF TIME
140

DIVIDE A TIME INTERVAL INTO BINS
142

STORE TRACKED ACTIVITY IN DATA STRUCTURE ENTRIES
144

MARK ACTIVITY BY INCREMENTING A COUNT ASSOCIATED WITH A BIN
MATCHING THE DURATION OF THE IDLE PERIOD BASED ON A NUMBER
OF IDLE PERIODS TRACKED FOR THE MATCHING DURATION
146

RETURN / DISPLAY INFORMATION
148

| TOTAL NUMBER OF BINS 202 | BIN NUMBER 204 | BIN TIME DURATION / RANGE 206 | BIN COUNT 208 |
|---|---|---|---|
| 13 | 0 | < 1.0 microsecond (0-4 cycles) | 0 |
| 13 | 1 | 1.0-1.9 microseconds (5-9 cycles) | 4 |
| 13 | 2 | 2.0-2.9 microseconds (10-14 cycles) | 12 |
| 13 | 3 | 3.0-3.9 microseconds (15-19 cycles) | 0 |
| 13 | 4 | 4.0-4.9 microseconds (20-24 cycles) | 3 |
| 13 | 5 | 5.0-5.9 microseconds (25-29 cycles) | 0 |
| 13 | 6 | 6.0-6.9 microseconds (30-34 cycles) | 0 |
| 13 | 7 | 7.0-7.0 microseconds (35-39 cycles) | 0 |
| 13 | 8 | 8.0-8.9 microseconds (40-44 cycles) | 0 |
| 13 | 9 | 9.0-9.9 microseconds (45-49 cycles) | 1 |
| 13 | 10 | 10.0-10.9 microseconds (50-54 cycles) | 0 |
| 13 | 11 | 11.0-11.9 microseconds (55-59 cycles) | 0 |
| 13 | 12 | >= 12.0 microseconds (>= 60 cycles) | 0 |

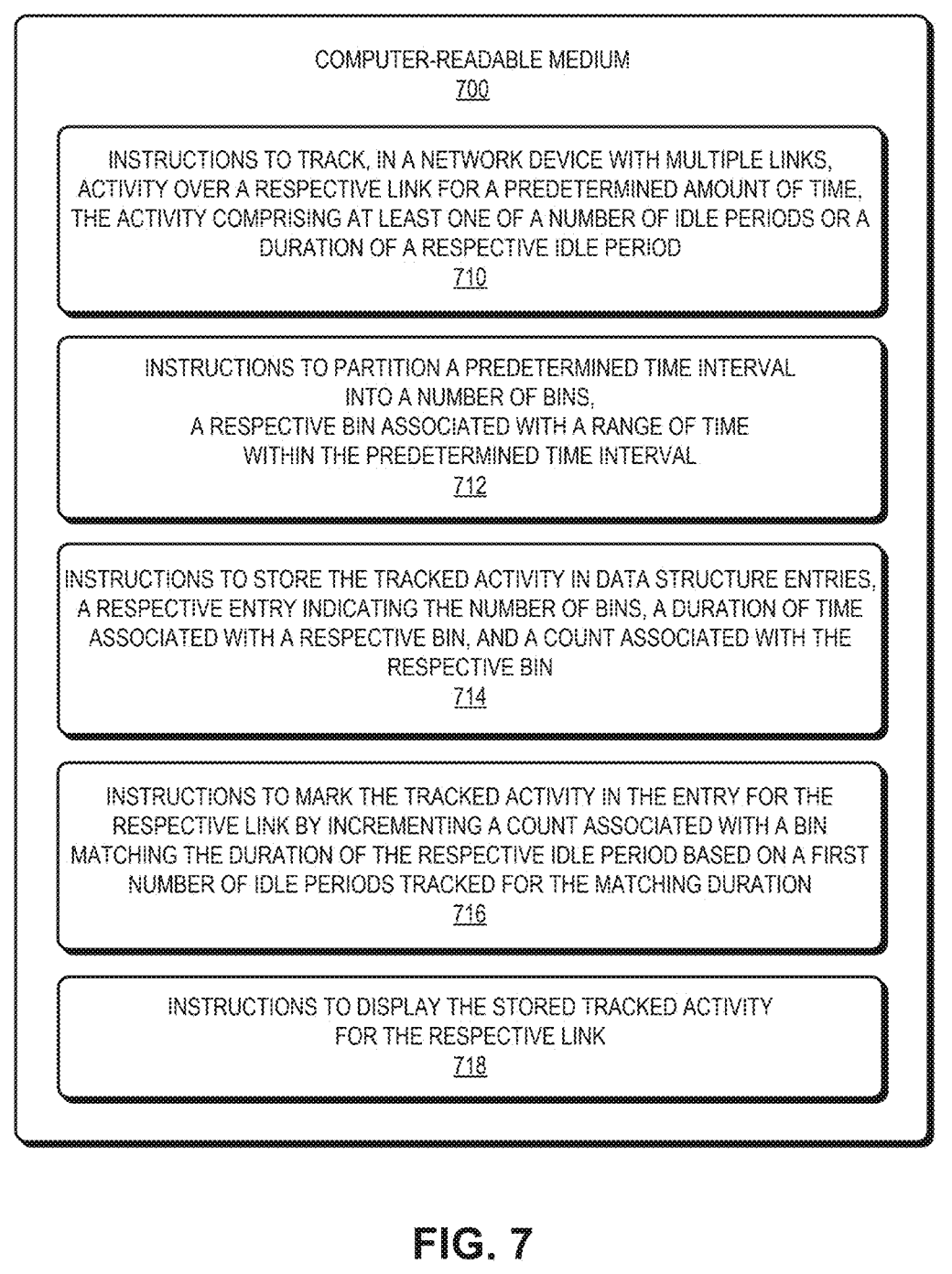

COMPUTER-READABLE MEDIUM
700

INSTRUCTIONS TO TRACK, IN A NETWORK DEVICE WITH MULTIPLE LINKS, ACTIVITY OVER A RESPECTIVE LINK FOR A PREDETERMINED AMOUNT OF TIME, THE ACTIVITY COMPRISING AT LEAST ONE OF A NUMBER OF IDLE PERIODS OR A DURATION OF A RESPECTIVE IDLE PERIOD
710

INSTRUCTIONS TO PARTITION A PREDETERMINED TIME INTERVAL INTO A NUMBER OF BINS, A RESPECTIVE BIN ASSOCIATED WITH A RANGE OF TIME WITHIN THE PREDETERMINED TIME INTERVAL
712

INSTRUCTIONS TO STORE THE TRACKED ACTIVITY IN DATA STRUCTURE ENTRIES, A RESPECTIVE ENTRY INDICATING THE NUMBER OF BINS, A DURATION OF TIME ASSOCIATED WITH A RESPECTIVE BIN, AND A COUNT ASSOCIATED WITH THE RESPECTIVE BIN
714

INSTRUCTIONS TO MARK THE TRACKED ACTIVITY IN THE ENTRY FOR THE RESPECTIVE LINK BY INCREMENTING A COUNT ASSOCIATED WITH A BIN MATCHING THE DURATION OF THE RESPECTIVE IDLE PERIOD BASED ON A FIRST NUMBER OF IDLE PERIODS TRACKED FOR THE MATCHING DURATION
716

INSTRUCTIONS TO DISPLAY THE STORED TRACKED ACTIVITY FOR THE RESPECTIVE LINK
718

FIG. 7

TRACKING APPLICATION BEHAVIOR BASED ON PACKET SPACING

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

Field

Application behavior can be tracked by observing traffic generated by applications over a period of time on the order of seconds. However, processes typically operate on a much shorter timescale, e.g., milliseconds or microseconds. There-fore, this coarse-grain level of tracking cannot provide details of application performance. A much finer-grain level of control may sample counter data at high frequency. However, this may generate an enormous amount of data and associated processing load.

BRIEF DESCRIPTION OF THE FIGURES

FIG. 1B illustrates information displayed on a component of the environment of FIG. 1A, in accordance with an aspect of the present application.

FIG. 1C illustrates operations performed by a component of the environment of FIG. 1A, in accordance with an aspect of the present application.

FIG. 2 presents packet spacing information stored in a data structure, in accordance with an aspect of the present application.

FIG. 7 illustrates a computer-readable medium which facilitates tracking application behavior based on packet spacing, in accordance with an aspect of the present appli-cation.

In the figures, like reference numerals refer to the same figure elements.

DETAILED DESCRIPTION

Figure 1A:
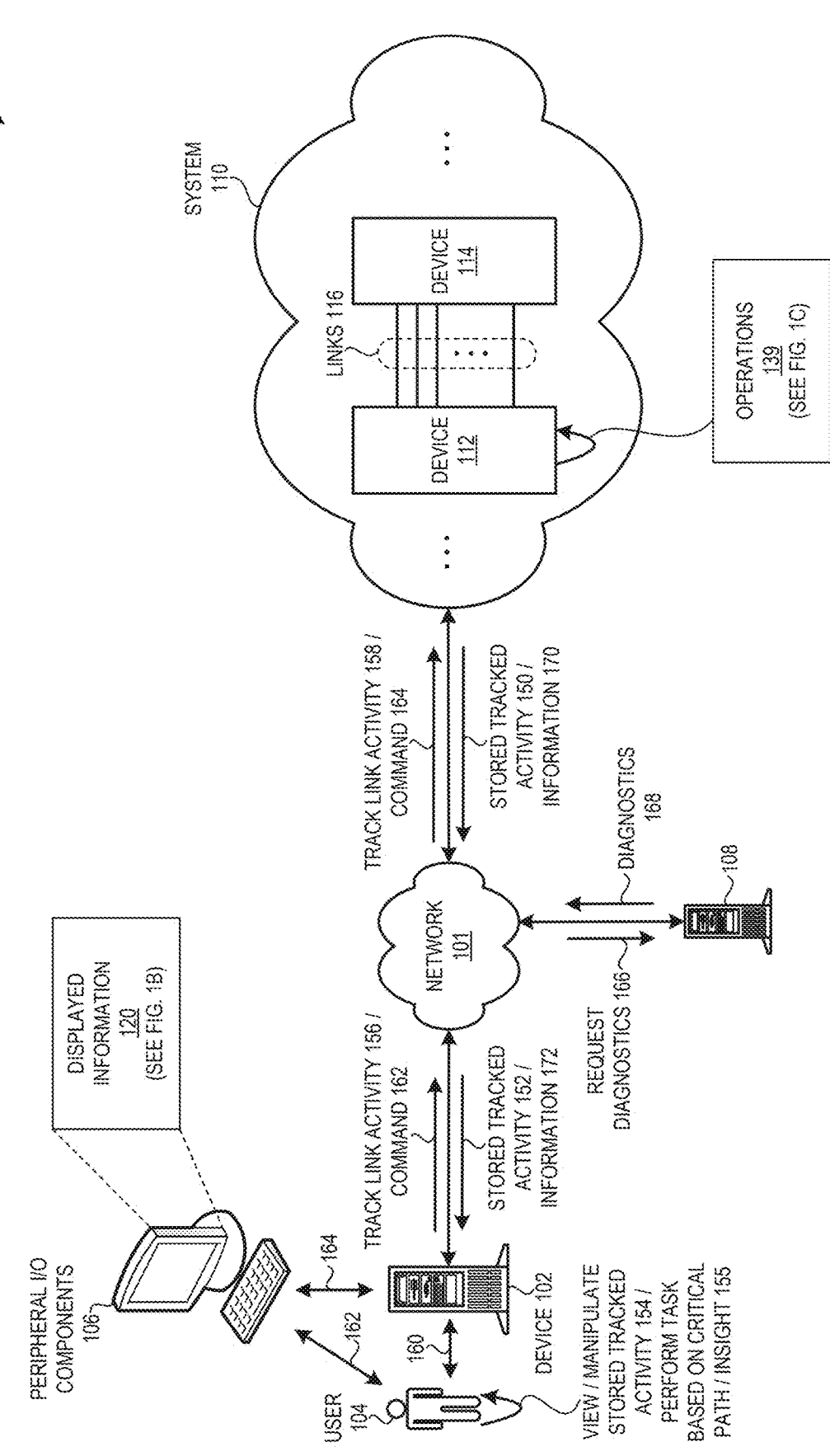
FIG. 1A illustrates an environment which facilitates track-ing application behavior based on packet spacing, in accor-dance with an aspect of the present application.

Aspects of the instant application provide a system which can track application behavior at a detailed level that is less burdensome than tracing every port and provides more than simple averages over long periods of time. The system can track link activity using device counters (marking an idle or busy state) over a period of time and display that information in a useful visual representation for the user, e.g., as a histogram. The displayed information can allow the user to take actions to address issues related to links which display abnormal, inconsistent, or unexpected behavior and can also provide insights regarding, e.g., critical paths in the system.

Application behavior can be tracked by observing traffic generated by applications over a period of time, e.g., by computing averages over a period time on the order of seconds. However, processes typically operate on a much shorter timescale, e.g., milliseconds or microseconds. Fur-thermore, as devices and systems continue to increase in size, merely observing traffic generated by applications on the order of seconds cannot provide an atomic view into the application behavior. Therefore, the coarse-grain level of tracking cannot provide details of application performance. On the other hand, many devices maintain counters which are incremented based on the occurrence of various events. This much finer-grain level of control may sample counter data at high frequency. However, given the increasing num-ber of devices and systems, the finer-grain level of control may generate an enormous amount of data and associated processing load.

The described aspects provide a system which addresses the limitations of using the coarse-grain and the finer-grain levels described above. The system can track application behavior at a detailed level by tracking whether a link is busy or idle on each cycle, e.g., every nanosecond. For example, a network device can track activity of data com-municated over a link, based on the number and duration of busy/idle periods, e.g., by resetting a counter or timer when the state of the link switches from a busy state to an idle state or from an idle state to a busy state. The terms "busy period" and "active period" are used interchangeably in this disclo-sure and can refer to the state of a link when data is being sent or is to be sent over the link. The term "idle period" can refer to the state of the link when no data is being sent or to be sent over the link. The network device can store the tracked activity as histogram data, which can indicate the distribution of link activity over time. A user may filter the data being tracked using several parameters, such as from a specific port, based on a traffic class, or based on an application. The gathered histogram data may subsequently be used to provide better information on application behav-ior. The histogram data may be presented in a visual or analytics manner to a network administrator, which can result in identifying critical paths and increasing efficiency. The histogram data may also be fed into an analytics engine, a machine learning model, or a pattern recognition system to produce diagnostics, and the diagnostics may be returned to a user for additional analysis and actions.

FIG. 1A illustrates an environment 100 which facilitates tracking application behavior based on packet spacing, in accordance with an aspect of the present application. FIG. 1B illustrates information 120 displayed on a component of the environment of FIG. 1A, in accordance with an aspect of the present application. FIG. 1C illustrates operations 139 performed by a component of the environment of FIG. 1A, in accordance with an aspect of the present application. Environment 100 may include a device 102, a server or system 108, and a system 110 which communicate over a network 101. Device 102 can be associated with a user 104 and peripheral input/output (I/O) components 106. The actions performed by user 104 as described herein may be performed by an algorithm/script, system, part of the system, or any other mechanism which can perform the respective described operation. Device 102 can receive commands from user 104 and display information on or receive data from peripheral I/O components 106 via, respectively, communications 160 and 164. User 104 can communicate with or send commands to device 102 using peripheral I/O components 106 via communications 160 and 162. Various elements or information (e.g., displayed information 120 as depicted in FIG. 1B) may be displayed (or entered or manipulated) using peripheral I/O components 106. Server 108 may include one or more computing devices and can store, retrieve, access, or generate information associated with diagnostics related to tracking application behavior. Server 108 may also include an analytics engine or a pattern recognition system which can produce or generate diagnostics, i.e., an analysis of the tracked activity of multiple links based on packet spacing. System 110 can be any system which includes entities or devices communicating over links or ports, e.g., a network fabric, an enterprise environment, or a high performance computing (HPC) system. System 110 may include at least devices 112 and 114, which can be coupled or connected and can communicate with each other over at least links 116.

During operation, device 112 can perform operations 139 (as depicted in FIG. 1C). Device 112 can track activity over a link (e.g., one of links 116) for a predetermined amount of time, e.g., 10 microseconds (operation 140). Device 112 can be a switch with multiple ports (i.e., links 116). Logic running on each switch port can track the busy or idle information and store the tracked activity in each port. The tracked activity may include traffic or packets sent including a spacing (i.e., idle period) between the traffic or packets. The time for the tracked activity can be classified or defined as either busy (i.e., data is being sent on the link or port) or idle (i.e., no data is being sent on the link or port).

The packet spacing tracked by device 112 can include a number of idle periods and a duration of a respective idle period, and can also include a number of busy periods and a duration of a respective busy period. The system can track an amount of time or a number of cycles during which a respective link is idle by maintaining a first counter, and the system can track an amount of time or a number of cycles during which a respective link is "active" (i.e., busy) by maintaining a second counter, as described below in relation to FIGS. 2 and 5.

The tracked activity information for busy periods versus idle periods may be complementary because activity over link is a binary characteristic. Aspects of the described embodiments in the application illustrate tracking the packet spacing based on the number and duration of the idle periods (as described below in relation to FIG. 4) but tracking the packet spacing may also be based on the number and duration of the busy periods (as described below in relation to FIG. 5). The tracked activity or packet spacing information can be read out from the switch via, e.g., a control status register (CSR) and subsequently used to update a data structure which stores the tracked activity, as described below and in relation to FIG. 2.

Device 112 can divide a predetermined time interval into a number of "bins" (operation 142). The term "bin" can be used as a noun, e.g., indicating or similar to a bucket into which similar items may be grouped or placed. The term "bin" can also be used as a verb, e.g., to "bin" or divide a range of values into a series of intervals. In this disclosure, the term "bin" is used as a noun. A histogram can indicate frequency distribution by dividing a predetermined time interval into bins, where each bin may be associated with a range of time within the predetermined time interval. For example, as described below in relation to FIGS. 3A-D, the predetermined time interval may be 11 microseconds split into 11 bins, and each of the 11 bins may correspond to a duration of ~1 microsecond from a starting value to an ending value, e.g., bin 1 can correspond to 1.0 to 1.9 microseconds, and bin 8 can correspond to 8.0 to 8.9 microseconds. Each bin may be split down to any smaller or more accurate number, e.g., bin 3 can correspond to any time between 3.0 and 3.9 microseconds or between 3.000 and 3.999 microseconds. Each bin can also correspond to a time duration or range based on a number of cycles. Device 112 can store the tracked activity in data structure entries (operation 144). An exemplary data structure is described below in relation to FIG. 2. Each entry can indicate the number of bins, a duration or range of time or cycles associated with a respective bin, and a count associated with the respective bin. While tracking activity over a respective link, device 112 can mark or indicate the tracked activity in the entry for the respective link by incrementing the count associated with a bin which matches the duration of the respective idle period based on the number of idle periods tracked for that duration (operation 146). For example, tracking 4 idle periods each of equal duration (e.g., 3 microseconds) can result in marking the bin for "3 microseconds" by incrementing the count for that bin by 4.

Subsequent to operations 140, 142, and 144, device 112 can return stored tracked activity 150 to device 102 (operation 148). Device 102 can receive stored tracked activity 150 (as stored tracked activity 152), which can be displayed as information 120 on peripheral I/O components 106. As depicted in FIG. 1B, displayed information 120 may include a visual representation of the tracked activity (e.g., as a histogram) 121, which can further include: a number of bins 122; a time duration/range for a bin 123; and a count for a bin 124. Displayed information 120 may also include filtered tracked activity 125, which can include a subset of the tracked activity based on a factor or characteristic of the traffic, e.g., by application 126, by traffic class 127, or by service 128. User 104 may use one or more interactive elements to filter the tracked activity, e.g., interactive elements associated with elements 125-128, and can also use element 132 to send a command to perform a filtering task. In some aspects, device 112 or another entity (not shown) may filter the tracked activity, and stored tracked activity 170 and/or 172 may include the filtered tracked activity, which can be subsequently displayed (e.g., as elements 125-128) as part of displayed information 120.

During various stages of the operation of the entities in environment 100, in response to user commands or requests, device 112 may return information 170 to device 102

(operation 148). Device 102 can receive information 170 (as information 172), which can be displayed as displayed information 120. Information 170/172 and displayed information 120 may include a critical path 129 and insights 130. Critical path 129 can indicate a link which is experiencing too much or too little of an idle or busy time (e.g., based on a predetermined threshold), including in comparison with other links of the same device or neighbor devices. Insights 130 can include information provided by device 112 or server 108, including diagnostics requested of and returned from server 108 (via communications 166 and 168). Insights 130 may include information which can be used by system 110, device 102, or device 112 to take an action which may result in improving the efficiency of the system or a device associated with the system. For example, insights 130 may indicate that a particular set link or set of links is experiencing a certain number of idle periods of a duration and at a frequency greater than a predetermined threshold (such as two links associated with device 112 experiencing 20 idle periods lasting over 12 microseconds or more than 60 cycles). Insights 130 may provide information or recommendations on actions to be taken to investigate or remediate abnormal idle periods for the two links. The examples of insights provided herein are for illustrative purposes only. Other types of insights may be possible and provided by any of the described entities in environment 100.

In some aspects, user 104 may obtain the insights by requesting the diagnostics from server 108 (which can include an analytics engine or a pattern recognition system). For example, user 104 may use interactive element 132 to send a command to perform a task, which command can be sent as a command 162 resulting in communications 166 and 168 and receiving back the requested diagnostics and insights from information 172. Information 170/172 and displayed information 120 may also include other information 131, which can be related to any of the tracked activity or operations described herein. Thus, device 112 can return information 170 (operation 148) which can be used to display elements 121-132. In some aspects, device 112 may display information (operation 148) to a directly connected peripheral I/O component (not shown), and the displayed information can include any of the elements 121-132.

As described above, displayed information 120 can include one or more interactive elements (such as element 132) which allow user 104 to send commands relating to, e.g., tracking link activity, configuring time intervals or bins, obtaining and displaying histograms, and requesting diagnostics or insights. User 104 can view and/or manipulate displayed information 120 (operation 154) using the one or more interactive elements. User 104, an algorithm/script, system, part of the system, or any other mechanism may also perform a task based on the critical path or an insight (operation 155), such as performing an action which causes traffic to be redirected from a critical path identified as overly busy or redirected to another path over a link identified as overly idle. User 104, an algorithm/script, system, part of the system, or any other mechanism may also perform an action based on an insight associated with filtered tracked activity. For example, if a particular set of links for a specific application is experiencing a "bursty stream" of traffic (i.e., significant and inconsistent amounts and rates of traffic, such as many long busy periods and few short busy periods mixed with inconsistently occurring idle periods, or a combination of long and short busy periods mixed with short idle periods), the system may indicate this as part of insights 130 and may provide user 104 with recommendations on how to address the inconsistent bursts of traffic. Furthermore, if a link experiences a "steady stream" of traffic (i.e., consistently spaced busy periods of similar length), the system may indicate this as part of insights 130 and may provide user 104 with information that the link is efficiently operating at a desired or optimal rate. The above examples of steady and bursty streams of traffic are provided for illustrative purposes only. Other scenarios may be used to described steady or bursty streams of traffic. Information obtained relating to current link performance (e.g., related to a bursty stream of traffic or a steady stream of traffic, or a number, duration, and frequency of busy or idle periods) can be referred to as "dynamic, real-time telemetry" and may be associated with an application, a traffic class, or a service.

FIG. 2 presents packet spacing information stored in a data structure 200, in accordance with an aspect of the present application. Data structure 200 can be, e.g., a table 200. Table 200 can include rows with columns or fields including: a total number of bins 202; a bin number 204 (e.g., an index); a bin time duration/range 206; and a bin count 208. For example, an entry 210 can indicate that for a time interval divided into 13 bins, a bin numbered 1 covers a time duration of 1.0 to 1.9 microseconds (or 5-9 cycles) with a total bin count of 4. For the same time interval divided into 13 bins: an entry 212 can indicate that a bin numbered 2 covers a time duration of 2.0 to 2.9 microseconds (or 10-14 cycles) with a total bin count of 12; an entry 214 can indicate that a bin numbered 4 covers a time duration of 4.0 to 4.9 microseconds (or 20-24 cycles) with a total bin count of 3; and an entry 216 can indicate that a bin numbered 9 covers a time duration of 9.0 to 9.9 microseconds (or 45-49 cycles) with a total bin count of 1. The data depicted in the bins numbered 1-11 of data structure 200 can correspond to the tracked activity depicted in FIG. 3C.

Data structure 200 may also include upper and lower limit boundary bins. For example: an entry 220 can indicate that a bin numbered 0 covers a time duration of less than 1 microsecond (or 0-4 cycles) with a total bin count of 0; and an entry 222 can indicate that a bin numbered 12 covers a time duration of greater than or equal to 12.0 microseconds (or greater than or equal to 60 cycles) with a total bin count of 0. The bins numbered 0 and 12 are depicted in data structure 200 of FIG. 2, but are not depicted in histograms 330, 350, 370, and 390 of, respectively, FIGS. 3A-D, which only depict the eleven bins numbered 1 to 11.

Data structure 200 can correspond to only idle periods or only busy periods by maintaining a single bin count 208 for the respective tracked or incremented idle or busy period. In some aspects, data structure 200 may include, for the same total number of bins and bin duration/range, two separate columns or counts, e.g., a column for histogram counters related to idle periods and a column for histogram counters related to busy periods. Thus, as described below in relation to FIG. 5, a transition from an idle state to a busy state, or from a busy state to an idle state, can result in the system incrementing exactly one histogram counter in either the idle duration histogram counters or the busy duration histogram counters, depending on the direction of the transition.

Figure 3A:
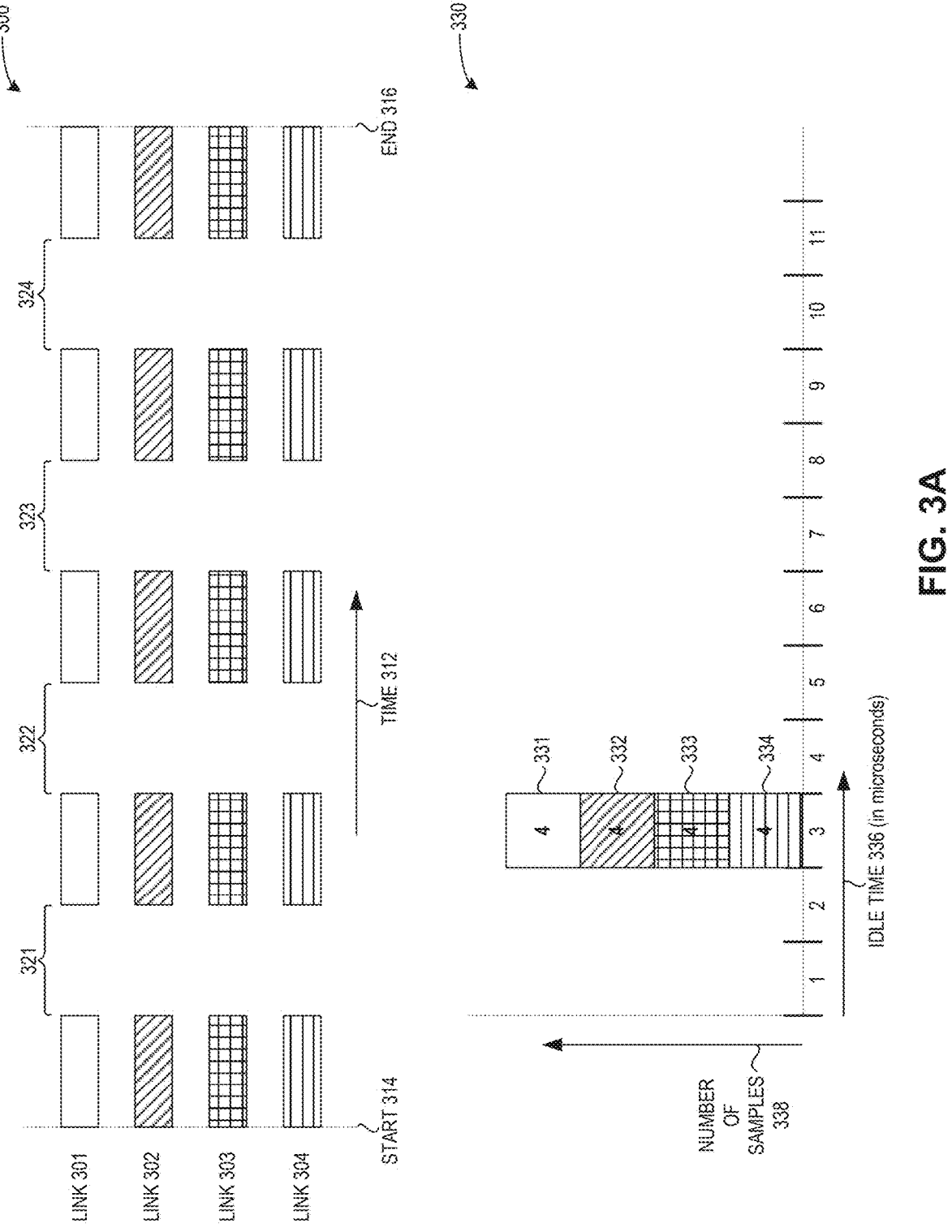
FIG. 3A presents a diagram of packet spacing (busy/idle periods) and a visual representation (histogram) of the packet spacing, for four links with an equal number of equally spaced idle periods, in accordance with an aspect of the present application.

FIG. 3A presents a diagram 300 of packet spacing (busy/idle periods) and a visual representation (histogram) 330 of the packet spacing, for four links 301, 302, 303, and 304 with an equal number of equally spaced idle periods, in accordance with an aspect of the present application. Links 301-304 can correspond to links 116 of FIG. 1A. In FIGS. 3A-D, activity including busy periods associated with each link is indicated by specific shading in the diagrams (i.e., diagrams 300, 340, 360, and 380): link 301 busy activity is depicted with blank rectangles; link 302 busy activity is depicted with rectangles filled with a right-slanting pattern; link 303 busy activity is depicted with rectangles filled with a perpendicular cross-hatch pattern; and link 304 busy activity is depicted with rectangles filled with vertical lines. Furthermore, activity including idle periods is depicted with blank spaces between the variously shaded rectangles. Also, in FIGS. 3A-D, time 312 is depicted towards the right and the time interval during which the activity over links 301-304 is being tracked begins at a time indicated by start 314 and ends at a time indicated by end 316. Furthermore, in FIGS. 3A-D, the histograms (i.e., histograms 330, 350, 370, and 390) illustrate a visual representation of the packet spacing and activity tracked of links 301-304, where the x-axis indicates an idle time 336 is measured in microseconds, with 11 bins each of a same time range (with a duration of an increasing number of microseconds), and where the y-axis indicates a number of samples 338 (corresponding to the count for each bin).

While the duration of the bins indicated in FIGS. 3A-D are based on a fixed range of increasingly longer duration, the bins can be of any size. That is, the granularity and number of bins on the x-axis may be of any size and can result in a "modified and improved" coarse-grain and fine-grain scale over the existing methods. For example, in the described aspects, for a coarse-grain distribution, the system may use a small number of bins each representing a larger time duration or window, and for a fine-grain distribution, the system may use a larger number of bins each representing a smaller time duration or window. Thus, the amount and level of data displayed (as in FIGS. 3A-D) can be configured based on the needs of a user, application, or system. The range of distributions possible for displaying the activity over links (i.e., the modified and improved coarse-grain distribution and fine-grain distribution described above) in the described aspects can provide an amount of control which is significantly greater than merely using averages (coarse-grain scale of existing methods) or recording traces on every port (fine-grain scale of existing methods).

In diagram 300, the tracked activity for each of the four links 301-304 includes four idle periods of equal duration (e.g., idle periods 321, 322, 323, and 324). This information can be depicted in histogram 330 as: a block 331 (labeled with a count of "4" corresponding to the four idle periods for link 301); a block 332 (labeled with a count of "4" corresponding to the four idle periods for link 302); a block 333 (labeled with a count of "4" corresponding to the four idle periods for link 303); and a block 334 (labeled with a count of "4" corresponding to the four idle periods for link 301. Blocks 331-334 can be in the bin corresponding to 3 microseconds.

A user or system may analyze the data which generates histogram 330 or histogram 330 itself and determine that no action needs to be taken as all four links are experiencing the same amount of traffic in the same pattern of idle/busy. Alternatively, the user or system may determine that because the bin count for the 3 microseconds bin is greater than a certain threshold number (e.g., 8), that an action is to be taken to further investigate activity of links 301-304, e.g., to reduce the number or duration of the idle periods.

Figure 3B:
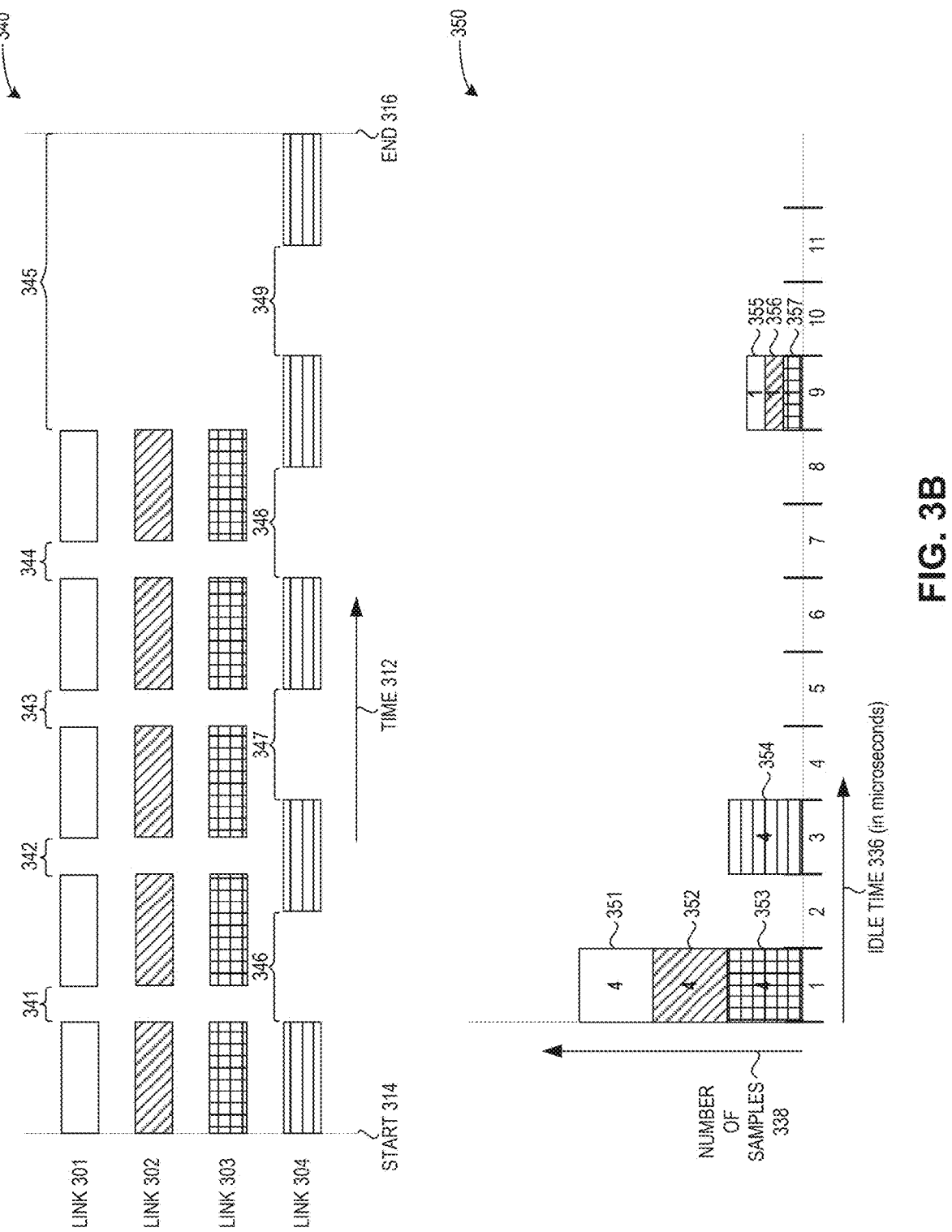
FIG. 3B presents a diagram of packet spacing (busy/idle periods) and a visual representation (histogram) of the packet spacing, for four links with a different number of differently spaced idle periods, in accordance with an aspect of the present application.

FIG. 3B presents a diagram 340 of packet spacing (busy/idle periods) and a visual representation (histogram) 350 of the packet spacing, for four links with a different number of differently spaced idle periods, in accordance with an aspect of the present application. In diagram 340, the tracked activity for each of the three links 301-303 includes four shorter idle periods of equal duration (idle periods 341, 342,

343, and 344) and one longer idle period of equal duration (idle period 345). The four shorter idle periods (341-344) can be depicted in histogram 350 as: a block 351 (labeled with a count of "4" corresponding to the four shorter idle periods for link 301); a block 352 (labeled with a count of "4" corresponding to the four shorter idle periods for link 302); and a block 353 (labeled with a count of "4" corresponding to the four shorter idle periods for link 303). Blocks 351-353 can be in the bin corresponding to 1 microsecond. The one longer idle period (345) can be depicted as blocks 355, 356, and 357, each labeled with a count of "1" corresponding to the one longer idle period for, respectively, links 301, 302, and 303. Blocks 355-357 can be in the bin corresponding to 9 microseconds.

In diagram 340, the tracked activity for link 304 is different from that of links 301-303 and includes four medium duration idle periods of equal duration (idle periods 346, 347, 348, and 349). These four medium duration idle periods can be depicted in histogram 350 as a block 354 (labeled with a count of "4" corresponding to the four medium duration idle periods for link 304). Block 354 can be in the bin corresponding to 3 microseconds.

A user or system may analyze the data (e.g., as depicted in FIG. 2) which generates histogram 350 or histogram 350 itself and determine that an action needs to be taken because three links (301-303) are experiencing somewhat bursty traffic (i.e., with four short idle periods at the start of the measured time interval and one long idle period at the end of the measured time interval), while the fourth link (304) is experiencing more consistently distributed idle periods over the measured time interval. The determined action may include re-distributing traffic until the idle periods on all four links are more consistent and indicate less bursty traffic over the links as a whole.

Figure 3C:
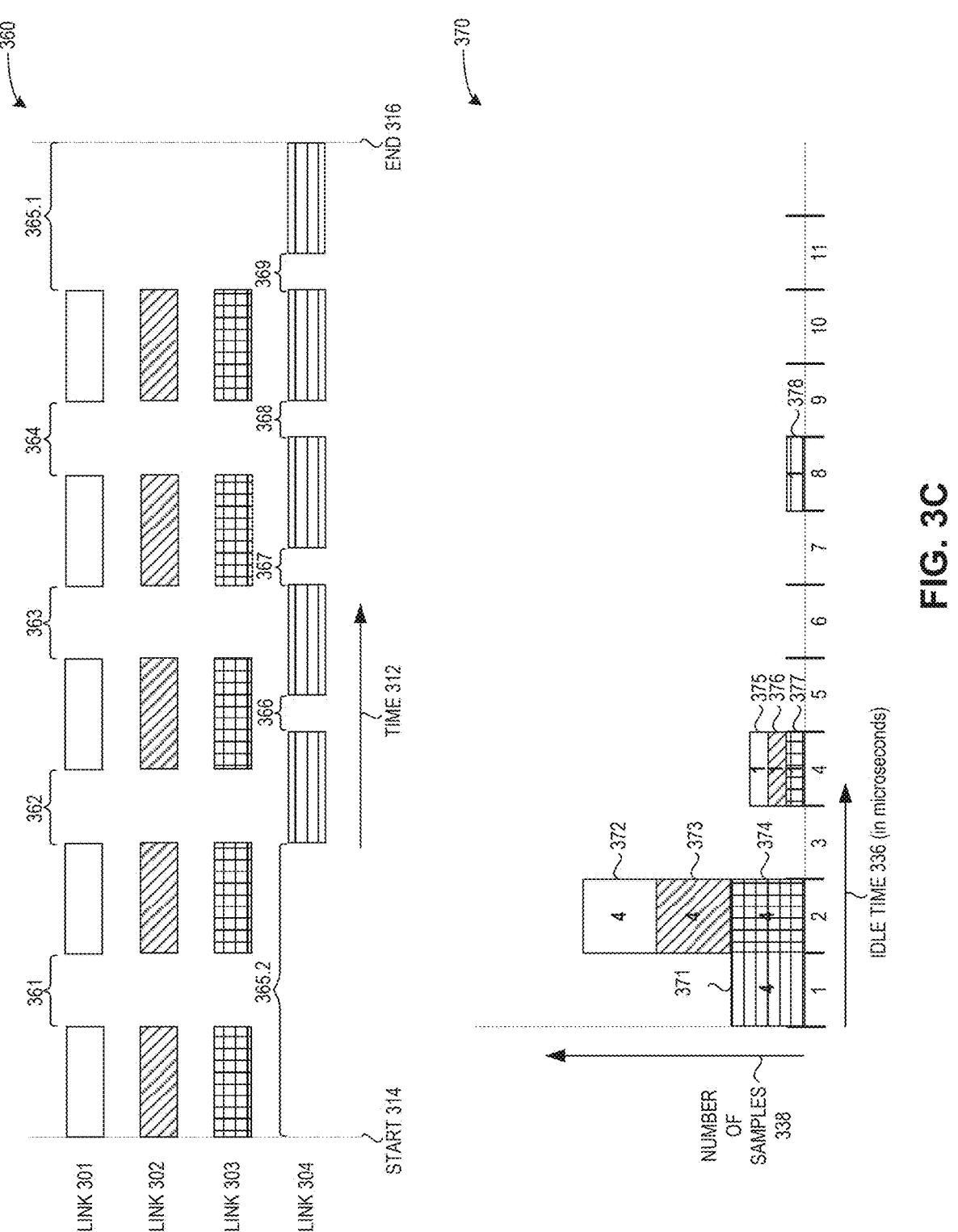
FIG. 3C presents a diagram of packet spacing (busy/idle periods) and a visual representation (histogram) of the packet spacing, for four links with a different number of differently spaced idle periods, in accordance with an aspect of the present application.

FIG. 3C presents a diagram 360 of packet spacing (busy/idle periods) and a visual representation (histogram) 370 of the packet spacing, for four links with a different number of differently spaced idle periods, in accordance with an aspect of the present application. In diagram 360, the tracked activity for each of the three links 301-303 includes four shorter idle periods of equal duration (idle periods 361, 362, 363, and 364) and one medium duration idle period of equal duration (idle period 365.1). The four shorter idle periods can be depicted in histogram 370 as: a block 372 (labeled with a count of "4" corresponding to the four shorter idle periods for link 301); a block 373 (labeled with a count of "4" corresponding to the four shorter idle periods for link 302); and a block 374 (labeled with a count of "4" corresponding to the four shorter idle periods for link 303). Blocks 372-374 can be in the bin corresponding to 2 microseconds. The one medium duration idle period can be depicted as blocks 375, 376, and 377 (in the bin corresponding to 4 microseconds), each labeled with a count of "1" corresponding to the one medium duration idle period for, respectively, links 301, 302, and 303.

In diagram 360, the tracked activity for link 304 is different from that of links 301-303 and includes one longer idle period at the start (idle period 365.2) followed by four shorter idle periods of equal duration (idle periods 366, 367, 368, and 369). In histogram 370, the longer idle period can be depicted as a block 378, labeled with a count of "1" in the bin corresponding to 8 microseconds, and the four shorter idle periods can be depicted as a block 371, labeled with a count of "4" in the bin corresponding to 1 microsecond.

A user or system may analyze the data which generates histogram 370 or histogram 370 itself and determine that an action needs to be taken because three links (301-303) are experiencing somewhat steady traffic (i.e., with only four medium duration idle periods at the start of the measured time interval and one slightly longer idle period at the end of the measured time interval), while the fourth link (304) is experiencing somewhat bursty traffic (i.e., with one long idle period at the start followed by four shorter idle periods until the end). As with the determined action based on FIG. 3B, the determined action based on FIG. 3C may include re-distributing traffic until the idle periods on all four links are more consistent and indicate less bursty traffic over the links as a whole. The determined action based on FIG. 3C may also involve investigating or checking link 304 to understand why such a long idle period exists at the start of the measured time interval.

Figure 3D:
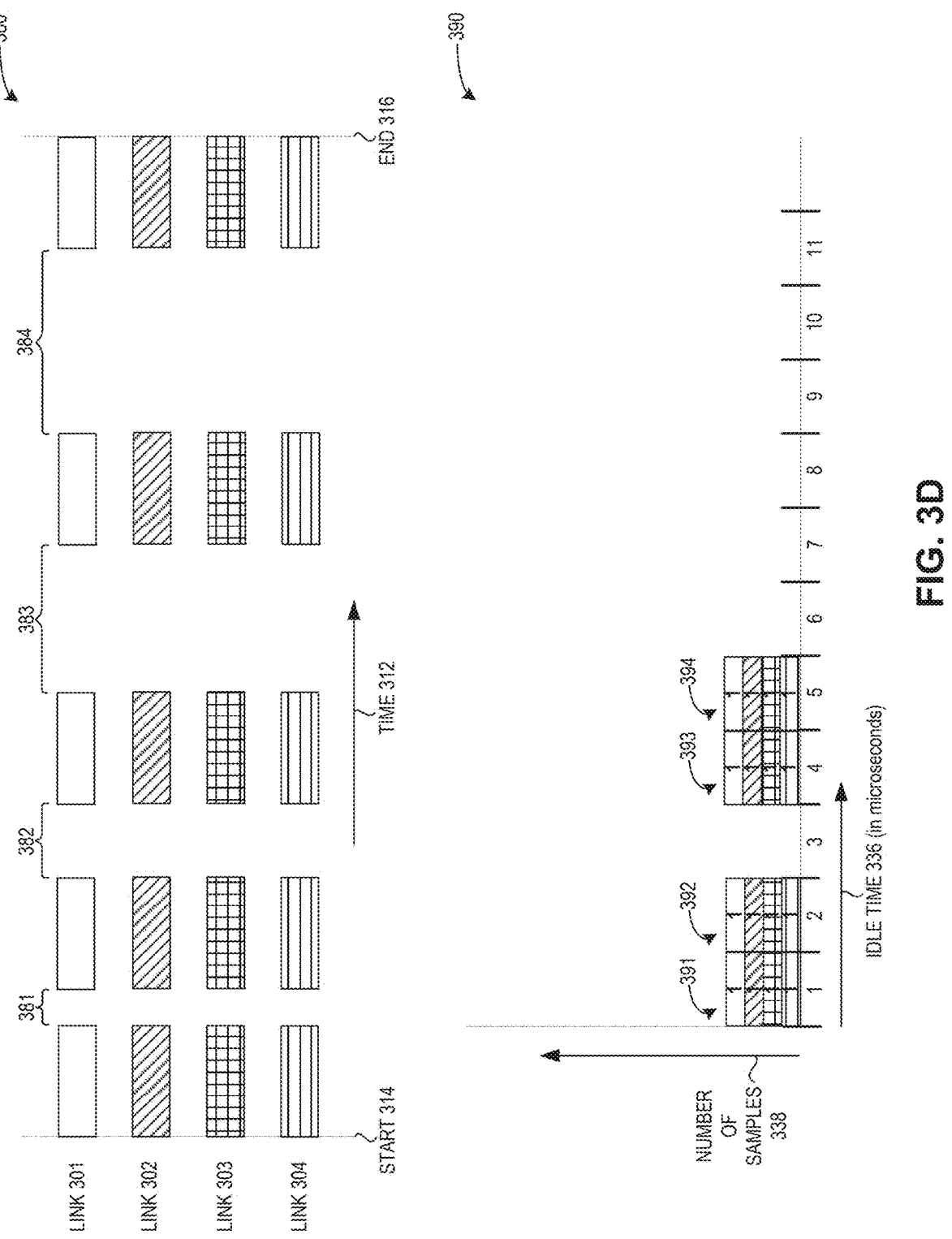
FIG. 3D presents a diagram of packet spacing (busy/idle periods) and a visual representation (histogram) of the packet spacing, for four links with a same number of differently spaced idle periods, in accordance with an aspect of the present application.

FIG. 3D presents a diagram 380 of packet spacing (busy/idle periods) and a visual representation (histogram) 390 of the packet spacing, for four links with a same number of differently spaced idle periods, in accordance with an aspect of the present application. In diagram 380, the tracked activity for each of the four links 301-304 includes four idle periods of equal but increasingly longer duration (e.g., idle periods 381, 382, 383, and 384). This information can be depicted in histogram 390 as: four blocks 391, each labeled with a count of "1" corresponding to the first and shortest idle period 381 and in the bin corresponding to 1 microsecond; four blocks 392, each labeled with a count of "1" corresponding to the second idle period 382 and in the bin corresponding to 2 microseconds; four blocks 393, each labeled with a count of "1" corresponding to the third idle period 383 and in the bin corresponding to 4 microseconds; and four blocks 394, each labeled with a count of "1" corresponding to the fourth and longest idle period 384 and in the bin corresponding to 5 microseconds.

A user or system may analyze the data which generates histogram 390 or histogram 390 itself and determine that an action needs to be taken because each of the four links (301-304) is experiencing idle periods which grow increasingly longer in duration. The determined action based on FIG. 3D may include checking all the links to determine what may be causing the increasingly longer durations of idle periods.

Thus, by tracking link activity and marking the tracked link activity in the manner described herein (i.e., as bin data), instead of using a simple average as in existing methods, the described aspects can efficiently provide, a fine-grained distribution of activity over the links, which can be displayed as a histogram. The tracked link activity may also be transmitted to another entity (e.g., an analytics engine, a machine learning model, or a pattern recognition system, as described above in relation to diagnostics 168 and server 108 of FIG. 1A) to obtain diagnostics and insights.

Figure 4:
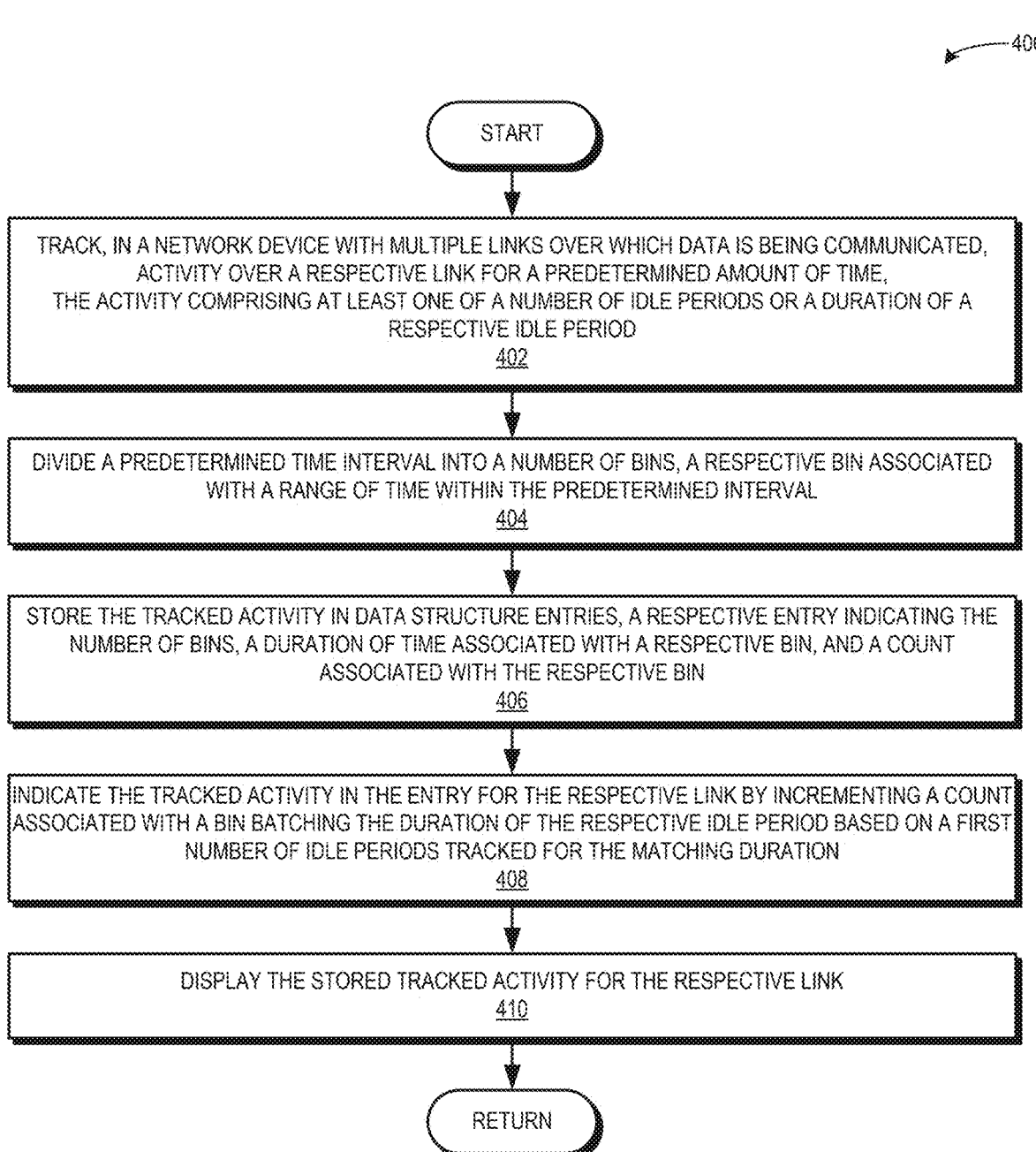
FIG. 4 presents a flowchart illustrating a method which facilitates tracking application behavior based on packet spacing, in accordance with an aspect of the present appli-cation.

FIG. 4 presents a flowchart 400 illustrating a method which facilitates tracking application behavior based on packet spacing, in accordance with an aspect of the present application. During operation, the system tracks, in a network device with multiple links over which data is being communicated, activity over a respective link for a predetermined amount of time, the activity comprising at least one of a number of idle periods or a duration of a respective idle period (operation 402). For example, in system 110 of FIG. 1A, device 112 can include multiple links 116 over which data is being communicated to, e.g., device 114. Device 112 can track activity (of either busy status or idle status) over a link for a certain amount of time, as described above in relation to operation 140 of FIG. 1C. The certain amount of time may be configured by a user associated with device 112 or by the system or set as a default value.

The system divides a predetermined time interval into a number of bins, a respective bin associated with a range of time within the predetermined time interval (operation 404). For example, as described above in relation to operation 142 of FIG. 1C and data structure 200 of FIG. 2, the time interval can be 11 microseconds, and the number of bins can be 11, where each bin can represent an additional microsecond more than the prior bin, e.g., bin 1 corresponds to 1 microsecond, bin 2 corresponds to 2 microseconds, etc.

The system stores the tracked activity in data structure entries, a respective entry indicating the number of bins, a duration of time associated with a respective bin, and a count associated with the respective bin (operation 406), as described above in relation to at least entries 210, 212, 214, and 216 in data structure 200 of FIG. 2.

The system indicates the tracked activity in the entry for the respective link by incrementing a count associated with a bin matching the duration of the respective idle period based on a first number of idle periods tracked for the matching duration (operation 408). The bin count may be maintained, e.g., in a column or field 208 of entries in data structure 200 of FIG. 2.

The system displays the stored tracked activity for the respective link (operation 410). For example, given a flow such as the one depicted in diagram 300 of FIG. 3A, the tracked activity for links 301-304 can be displayed as histogram 330 of FIG. 3A. Similarly, given the flows depicted in diagrams 340, 360, and 380 of, respectively, FIGS. 3B, 3C, and 3D, the tracked activity for links 301-304 can be displayed as histograms 350, 370, and 390 of, respectively, FIGS. 3B, 3C, and 3D.

Figure 5:
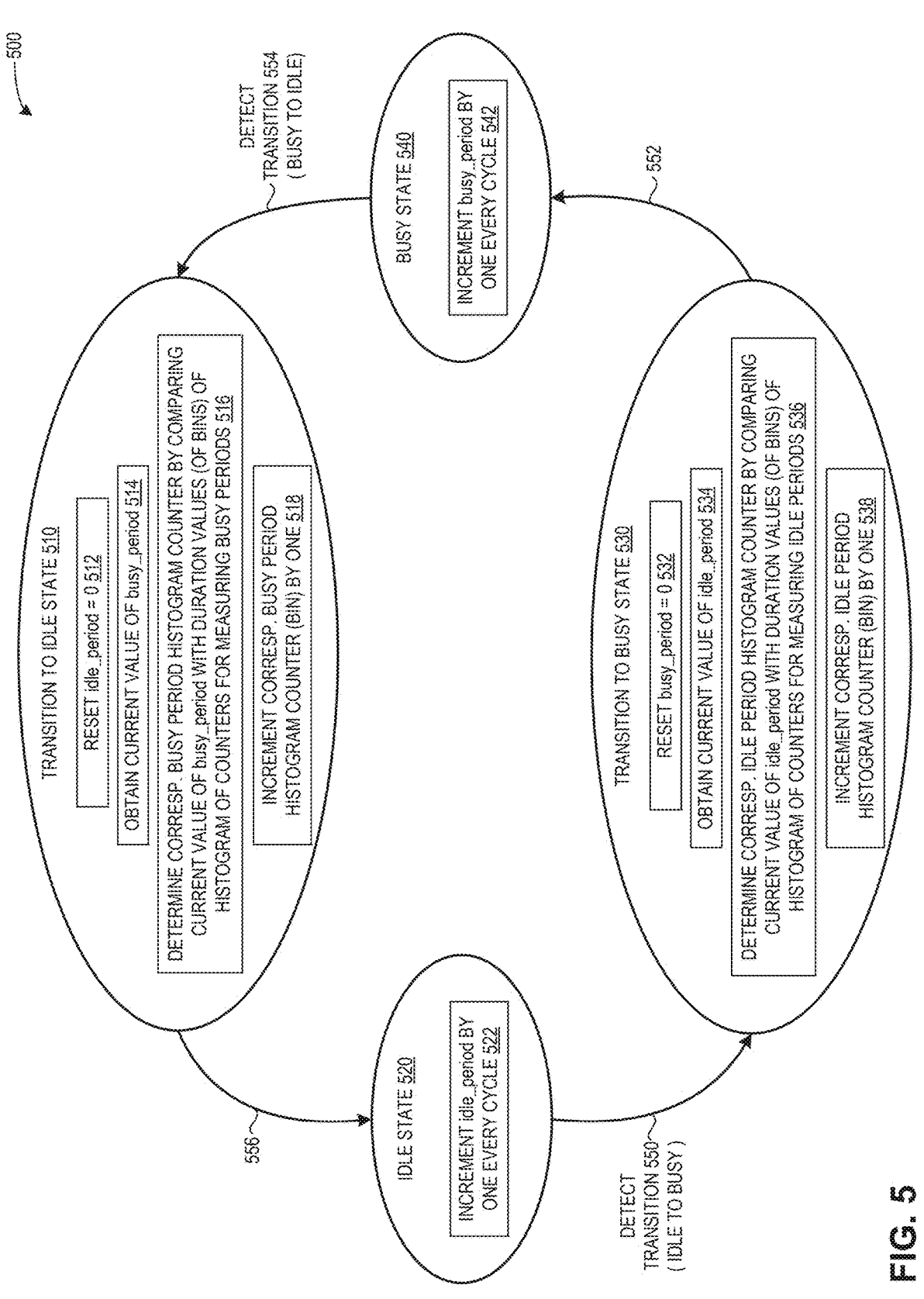
FIG. 5 illustrates a diagram of transitions and operations performed between and during idle and busy states, in accordance with an aspect of the present application.

FIG. 5 illustrates a diagram 500 of transitions and operations performed between and during idle and busy states, in accordance with an aspect of the present application. Diagram 500 can indicate a mechanism implemented by the described system that counts idle periods and busy periods, e.g., using counters denoted as, respectively, "idle_period" and "busy_period." For a given link, the mechanism can detect a transition of activity on the link from a busy state (i.e., sending data or having data that needs to be sent) to an idle state (i.e., not sending data or not having data to be sent) and can also detect a transition of activity on the link from an idle state to a busy state.

In diagram 500, assume that the link begins in an idle state 520. The system can increment the idle_period counter by one on every cycle (operation 522). If the system detects a transition from idle to busy (i.e., if the link has data to send or be sent, indicated by a trigger 550), the link may be in a transition to busy state 530, and the system can perform several operations. The system can reset the busy_period counter to a value of zero (operation 532). The system can obtain the current value of the idle_period counter (operation 534). The system can determine the corresponding idle period histogram counter by comparing the current value of the idle_period counter with the duration values (i.e., of the bins) of the histogram of counters for measuring idle periods (operation 536). The system can subsequently increment the corresponding idle period histogram counter (i.e., bin) by one (operation 538). For example, assuming that data structure 200 in FIG. 2 stores information related to idle periods, if the idle_period counter has a current value of "22" (i.e., 22 cycles), the system can determine that the corresponding idle period histogram counter is for the bin numbered 4, which corresponds to a bin time duration/range of 20-24 cycles. The system can then increment that bin count (column 208 for row 214) by one.

When the link completes transition to a busy state 540 (indicated by 552), the system can increment the busy_period counter by one on every cycle (operation 542). If the system detects a transition from busy to idle (i.e., if the link has no data to send or be sent, indicated by a trigger 554), the link may be in a transition to idle state 510, and the system can perform several operations. The system can reset the idle_period counter to a value of zero (operation 512). The system can obtain the current value of the busy_period counter (operation 514). The system can determine the corresponding busy period histogram counter by comparing the current value of the busy_period counter with the duration values (i.e., of the bins) of the histogram of counters for measuring busy periods (operation 516). The system can subsequently increment the corresponding busy period histogram counter (i.e., bin) by one (operation 518). For example, assuming that data structure 200 in FIG. 2 stores information related to busy periods, if the busy_period counter has a current value of "45" (i.e., 45 cycles), the system can determine that the corresponding busy period histogram counter is for bin number 9 which corresponds to a bin time duration/range of 45-49 cycles. The system can then increment that bin count (column 208 for row 216) by one.

When the link completes transition to the idle state 520 (indicated by 556), the system may continue and repeat the operations and transitions described above. The system may maintain two data structures similar to data structure 200 in FIG. 2, i.e., one for histogram counters related to idle periods and one for histogram counters related to busy periods. In some aspects, as described above in relation to FIG. 2, the system may maintain a single data structure using the same total number of bins and bin time duration/range and can also include two separate bin counts (as columns), e.g., a bin count for idle periods and a bin count for busy periods, where the appropriate bin count is incremented in operations 518 and 538.

The system may cross check the traditional average link bandwidth measurement (e.g., collected using a simple counter which counts the number of busy cycles over a sample period of time) with an estimation of bandwidth derived from the histograms of the busy and idle periods (e.g., as generated from data structures such as data structure 200 of FIG. 2). The system may use the result of this cross check to provide additional insight into how a particular application uses network resources.

Furthermore, by incrementing the bin count for bins corresponding to certain time durations for either idle periods or busy periods, the described aspects can provide a simple analysis of the activity on the links in a network in the frequency domain, as opposed to the time domain. That is, because the bins each represent a different frequency of activity, the system can provide a frequency spectrum of the interaction of an application with the network. This can result in providing both a programmer and an administrator with greater insight into the performance, and the ways in which the performance may be improved, than using only a simple bandwidth measurement.

Figure 6:
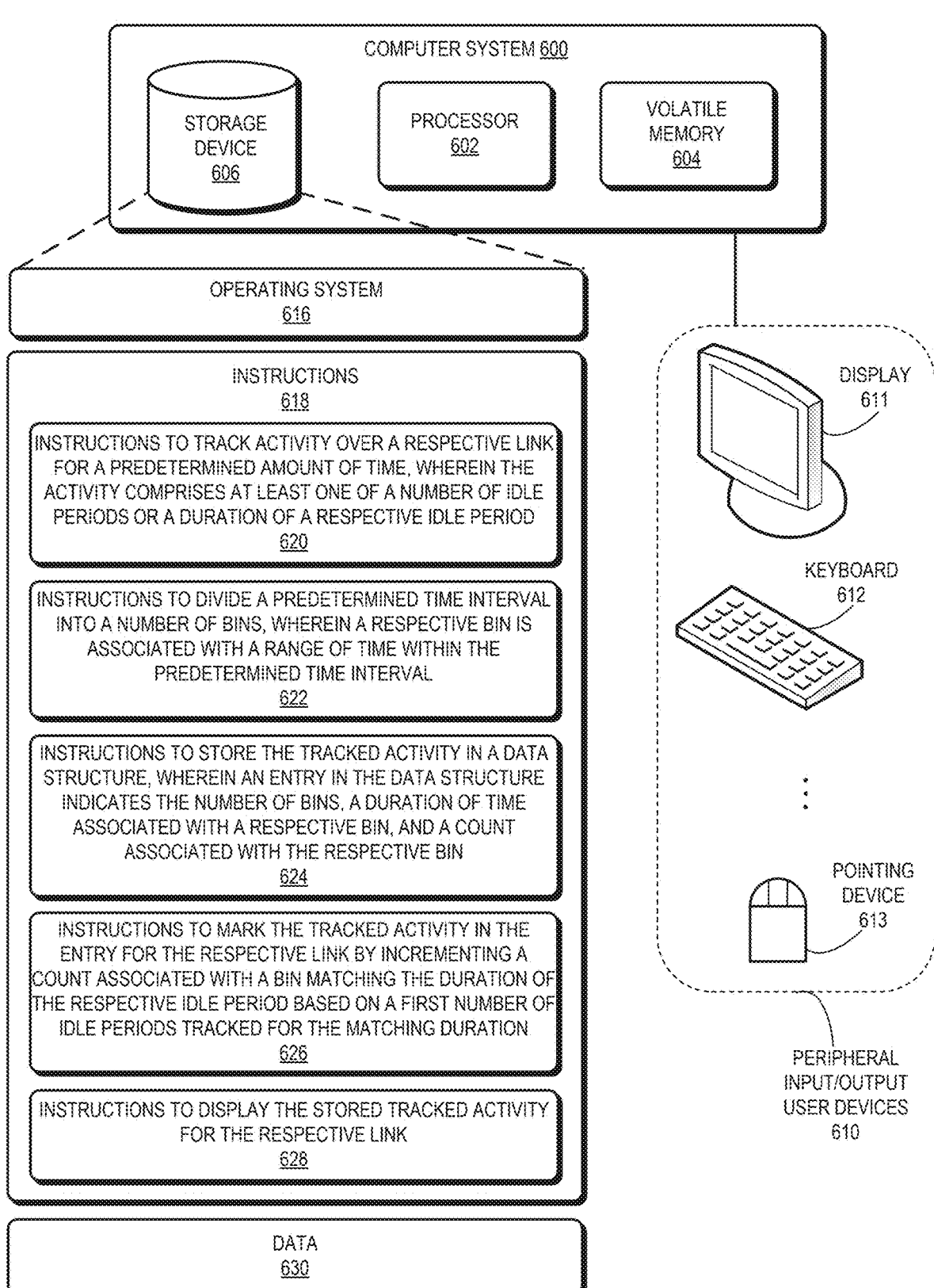
FIG. 6 illustrates a computer system which facilitates tracking application behavior based on packet spacing, in accordance with an aspect of the present application.

FIG. 6 illustrates a computer system 600 which facilitates tracking application behavior based on packet spacing, in accordance with an aspect of the present application. Computer system 600 includes a processor 602, a memory 604, and a storage device 606. Memory 604 may include a volatile memory (e.g., random access memory (RAM)) that serves as a managed memory and may be used to store one or more memory pools. Furthermore, computer system 600 may be coupled to peripheral input/output (I/O) user devices

610 (e.g., a display device 611, a keyboard 612, and a pointing device 613). Storage device 606 includes a non-transitory computer-readable storage medium and stores an operating system 616, instructions 618, and data 630. Computer system 600 can correspond to device 112 of FIG. 1A and may include fewer or more entities or instructions than those shown in FIG. 6. Instructions 618 may also reside on a single computing device or may be spread across multiple physical and virtual machines communicating in a networked environment.

Instructions 618 may include instructions 620-628, which when executed by computer system 600 (or by processor 602 of computer system 600), may cause computer system 600 to perform methods and/or processes described in this disclosure. Specifically, instructions 618 may include instructions 620 to track activity over a respective link for a predetermined amount of time, wherein the activity comprises at least one of a number of idle periods or a duration of a respective idle period, as described above in relation to operation 140 of FIG. 1C and operation 402 of FIG. 4. Instructions 618 may include instructions 622 to divide a predetermined time interval into a number of bins, wherein a respective bin is associated with a range of time within the predetermined time interval, as described above in relation to operations 142 and 404 of, respectively, FIGS. 1 and 4.

Instructions 618 may further include instructions 624 to store the tracked activity in a data structure, wherein an entry in the data structure indicates the number of bins, a duration of time associated with a respective bin, and a count associated with the respective bin. An example data structure with entries is described above in relation to data structure 200 of FIG. 2, including entries 210, 212, 214, and 216, which each indicate a total number of bins 202, a bin number 204, a bin time duration/range 206, and a bin count 208. Instructions 618 may also include instructions 626 to mark the tracked activity in the entry for the respective link by incrementing a count associated with a bin matching the duration of the respective idle period based on a first number of idle periods tracked for the matching duration, as described above in relation to bin count 208 in data structure 200 of FIG. 2 as well as in relation to creating the histograms displayed in FIGS. 3A-D. In some aspects, the tracked activity comprises at least one of a number of active periods or a duration of a respective active period, and instructions 626 are further to increment a count associated with a bin matching the duration of the respective active period based on a number of active periods tracked for the matching duration, as described above in relation to FIGS. 2 and 5.

Additionally, instructions 618 may include instructions 628 to display the stored tracked activity for the respective link, as described above in relation to operation 148 and displayed information 120 of FIG. 1B as well as in histograms 330, 350, 370, and 390 of, respectively, FIGS. 3A, 3B, 3C, and 3D.

Data 630 may include any data that is required as input or that is generated as output by the methods, operations, communications, and/or processes described in this disclosure. Specifically, data 630 may store at least: an identifier or indicator of a link; a status of busy or idle for activity or packet traffic over a link; an indicator of a link when busy or idle; a time interval; a bin; a number of bins; a bin time duration or range; a bin count; a data structure; data structure entries; a count; an incremented count; a visual representation of tracked activity over a link; an amount of time; a number of cycles; a counter; a number of idle or active periods; a duration of an idle or active period; a packet size; a total number of bytes communicated over a period of time;

an amount of time configured by a user; a start or stop time; an interval; a predefined event associated with an application or service; a histogram; a subset of data; filtered data; filtered data based on an application, traffic class, or service; an indicator of a user, an analytics engine, a machine learning model, or a pattern recognition system; telemetry; performance data; a critical path; an insight; a reported bandwidth usage; an indicator of a steady stream of packets or a bursty stream of packets; an indicator of an endpoint; and an identifier or indicator of an ingress switch, an intermediate switch, or a network interface controller (NIC).

Instructions 618 may include more instructions than those shown in FIG. 6. For example, instructions 618 may also store instructions for executing the operations described above in relation to: the environment of FIG. 1A; the operations resulting in the creation of the data structure in FIG. 2; the communication resulting in the diagrams and histograms of FIGS. 3A-D; the operations depicted in flowchart 400 of FIG. 4 and diagram 500 of FIG. 5; and the instructions of computer-readable medium 700 in FIG. 7.

FIG. 7 illustrates a computer-readable medium 700 which facilitates tracking application behavior based on packet spacing, in accordance with an aspect of the present application. CRM 700 may be a non-transitory computer-readable medium or device storing instructions that when executed by a computer or processor cause the computer or processor to perform a method. CRM 700 may store instructions 710 to track, in a network device with multiple links over which data is being communicated, activity over a respective link for a predetermined amount of time, the activity comprising at least one of a number of idle periods or a duration of a respective idle period, as described above in relation to operations 142 and 404 of, respectively, FIGS. 1 and 4. The activity can also comprise at least one of a number of active periods or a duration of a respective active period. CRM 700 may store instructions 712 to partition a predetermined time interval into a number of bins, a respective bin associated with a range of time within the predetermined time interval, as described above in relation to instructions 622 of FIG. 6, operation 142 of FIG. 1C, and operation 404 of FIG. 4.

CRM 700 may store instructions 714 to store the tracked activity in data structure entries, a respective entry indicating the number of bins, a duration of time associated with a respective bin, and a count associated with the respective bin, as described above in relation to data structure 200 of FIG. 2. CRM 700 may store instructions 716 to mark the tracked activity in the entry for the respective link by incrementing a count associated with a bin matching the duration of the respective idle period based on a first number of idle periods tracked for the matching duration, as described above in relation to bin count 208 in data structure 200 of FIG. 2. The data structure can store and increment idle period histogram counters, active period histogram counters, or both idle period and active period histogram counters. Furthermore, CRM 700 may store instructions 718 to display the stored tracked activity for the respective link, as described above in relation to creating histograms 330, 350, 370, and 390 displayed in FIGS. 3A-D.

CRM 700 may include more instructions than those shown in FIG. 7. For example, CRM 700 may also store instructions for executing the operations described above in relation to: the environment of FIG. 1A; the operations resulting in the creation of the data structure in FIG. 2; the communication resulting in the diagrams and histograms of FIGS. 3A-D; the operations depicted in flowchart 400 of FIG. 4 and diagram 500 of FIG. 5; and instructions 618 in FIG. 6.

In general, the disclosed aspects provide a method, a computer system, and a computer-readable medium (CRM) which facilitate tracking application behavior based on packet spacing. The system tracks, in a network device with multiple links over which data is being communicated, activity over a respective link for a predetermined amount of time. The activity comprises at least one of a number of idle periods or a duration of a respective idle period. The system divides a predetermined time interval into a number of bins. A respective bin is associated with a range of time within the predetermined time interval. The system stores the tracked activity in data structure entries. A respective entry indicates the number of bins, a duration of time associated with a respective bin, and a count associated with the respective bin. The system indicates the tracked activity in the entry for the respective link by incrementing a count associated with a bin matching the duration of the respective idle period based on a first number of idle periods tracked for the matching duration. The system displays the stored tracked activity for the respective link.

In a variation on this aspect, the system tracks an amount of time or a number of cycles during which the link is idle by maintaining a first counter. The system tracks an amount of time or a number of cycles during which the link is active by maintaining a second counter. The activity comprises at least one of a number of active periods or a duration of a respective active period. The respective bin is associated with a duration of the respective active period.

In a further variation on this aspect, the system calculates the duration of a respective idle period based on a packet size of the data being communicated and a number of total bytes being communicated for the predetermined amount of time.

In a further variation, the system tracks the activity over the respective link for the predetermined amount of time based on at least one of: an amount of time configured by a user; a start time or a stop time associated with an application or a service; or an interval based on occurrence of a predefined event associated with the application or service.

In a further variation, the system displays the stored tracked activity for the respective link as a histogram indicating the count of idle periods tracked for the duration of time associated with the respective bin.

In a further variation, the system obtains a subset of data by filtering the stored tracked activity based on at least one of: an application; a traffic class; or a service.

In a further variation, the system transmits the stored tracked activity or the filtered stored tracked activity to at least one of: a user; an analytics engine; a machine learning model; or a pattern recognition system.

In a further variation, the system receives information which facilitates: obtaining dynamic, real-time telemetry comprising performance data for a respective application; identifying a critical path associated with controlling performance of the respective application; providing insight into how the respective application uses network resources by analyzing the filtered stored tracked activity; determining whether a reported bandwidth usage is associated with sending a steady stream of packets or sending a bursty stream of packets; and determining whether a plurality of endpoints in a system exhibit the same or different behavior.

In another aspect, a computer system comprises a processor and a storage device storing instructions which when executed by the processor comprise instructions to perform operations. The instructions are to track activity over a respective link for a predetermined amount of time, wherein the activity comprises at least one of a number of idle periods or a duration of a respective idle period. The instructions are further to divide a predetermined time interval into a number of bins, wherein a respective bin is associated with a range of time within the predetermined time interval. The instructions are further to store the tracked activity in a data structure, wherein an entry in the data structure indicates the number of bins, a duration of time associated with a respective bin, and a count associated with the respective bin. The instructions are further to mark the tracked activity in the entry for the respective link by incrementing a count associated with a bin matching the duration of the respective idle period based on a first number of idle periods tracked for the matching duration. The instructions are further to display the stored tracked activity for the respective link. The computer system may include content-processing instructions which include more instructions, e.g., the instructions to perform the operations described herein, including in relation to: the environment of FIG. 1A; the operations resulting in the creation of the data structure in FIG. 2; the communication resulting in the diagrams and histograms of FIGS. 3A-D; the operations depicted in flowchart 400 of FIG. 4 and diagram 500 of FIG. 5; and the instructions of computer-readable medium 700 in FIG. 7.

In yet another aspect, a non-transitory computer-readable storage medium (CRM) stores instructions to track, in a network device with multiple links over which data is being communicated, activity over a respective link for a predetermined amount of time. The activity comprises at least one of a number of idle periods or a duration of a respective idle period. The instructions are further to partition a predetermined time interval into a number of bins, a respective bin associated with a range of time within the predetermined time interval. The instructions are further to store the tracked activity in data structure entries. A respective entry indicates the number of bins, a duration of time associated with a respective bin, and a count associated with the respective bin. The instructions are further to mark the tracked activity in the entry for the respective link by incrementing a count associated with a bin matching the duration of the respective idle period based on a first number of idle periods tracked for the matching duration. The instructions are further to display the stored tracked activity for the respective link. The CRM may also store instructions for executing the operations described above in relation to: the environment of FIG. 1A; the operations resulting in the creation of the data structure in FIG. 2; the communication resulting in the diagrams and histograms of FIGS. 3A-D; the operations depicted in flowchart 400 of FIG. 4 and diagram 500 of FIG. 5; and instructions 618 in FIG. 6.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
tracking, in a network device with multiple links over which data is being communicated, activity over a respective link for a predetermined amount of time, the activity comprising at least one of a number of idle periods or a duration of a respective idle period;
dividing a predetermined time interval into a number of bins, a respective bin associated with a range of time within the predetermined time interval;
storing the tracked activity in data structure entries, a respective entry indicating the number of bins, a duration of time associated with a respective bin, and a count associated with the respective bin;
indicating the tracked activity in the entry for the respective link by incrementing a count associated with a bin matching the duration of the respective idle period based on a first number of idle periods tracked for the matching duration; and
displaying the stored tracked activity for the respective link.

2. The method of claim 1, the method further comprising:
tracking an amount of time or a number of cycles during which the link is idle by maintaining a first counter.

3. The method of claim 1, the method further comprising:
tracking an amount of time or a number of cycles during which the link is active by maintaining a second counter,
wherein the activity comprises at least one of a number of active periods or a duration of a respective active period, and
wherein the respective bin is associated with a duration of the respective active period.

4. The method of claim 1, the method further comprising:
calculating the duration of a respective idle period based on a packet size of the data being communicated and a number of total bytes being communicated for the predetermined amount of time.

5. The method of claim 1, the method further comprising:
tracking the activity over the respective link for the predetermined amount of time based on at least one of:
an amount of time configured by a user;
a start time or a stop time associated with an application or a service; or
an interval based on occurrence of a predefined event associated with the application or service.

6. The method of claim 1, the method further comprising:
displaying the stored tracked activity for the respective link as a histogram indicating the count of idle periods tracked for the duration of time associated with the respective bin.

7. The method of claim 1, the method further comprising:
obtaining a subset of data by filtering the stored tracked activity based on at least one of:
an application;
a traffic class; or
a service.

8. The method of claim 7, the method further comprising:
transmitting the stored tracked activity or the filtered stored tracked activity to at least one of:
a user;

an analytics engine;
a machine learning model; or
a pattern recognition system.

9. The method of claim 8, the method further comprising receiving information which facilitates:

obtaining dynamic, real-time telemetry comprising performance data for a respective application;
identifying a critical path associated with controlling performance of the respective application;
providing insight into how the respective application uses network resources by analyzing the filtered stored tracked activity;
determining whether a reported bandwidth usage is associated with sending a steady stream of packets or sending a bursty stream of packets; and
determining whether a plurality of endpoints in a system exhibit the same or different behavior.

10. A computer system with multiple links over which data is being communicated, the computer system comprising:

a processor; and
a storage device storing instructions which when executed by the processor comprise instructions to:

track activity over a respective link for a predetermined amount of time, wherein the activity comprises at least one of a number of idle periods or a duration of a respective idle period;
divide a predetermined time interval into a number of bins, wherein a respective bin is associated with a range of time within the predetermined time interval;
store the tracked activity in a data structure, wherein an entry in the data structure indicates the number of bins, a duration of time associated with a respective bin, and a count associated with the respective bin;
mark the tracked activity in the entry for the respective link by incrementing a count associated with a bin matching the duration of the respective idle period based on a first number of idle periods tracked for the matching duration; and
display the stored tracked activity for the respective link.

11. The computer system of claim 10, wherein the computer system operates in a network and comprises at least one of:

an ingress network switch, wherein data is being transmitted from the ingress network switch to the network over the multiple links;
an intermediate switch, wherein data is being transmitted or received over the multiple links; or
a network interface controller (NIC).

12. The computer system of claim 10, the instructions further to:

track an amount of time or a number of cycles during which the link is idle by maintaining a first counter.

13. The computer system of claim 10, the instructions further to:

track an amount of time or a number of cycles during which the link is active by maintaining a second counter,
wherein the activity comprises at least one of a number of active periods or a duration of a respective active period, and
wherein the respective bin is associated with a duration of the respective active period.

14. The computer system of claim 10, the instructions further to:

track the activity over the respective link for the predetermined amount of time based on at least one of:
an amount of time configured by a user;
a start time or a stop time associated with an application or a service; or
an interval based on occurrence of a predefined event associated with the application or service.

15. The computer system of claim 10, the instructions further to:

display the stored tracked activity for the respective link as a histogram indicating the count of idle periods tracked for the duration of time associated with the respective bin.

16. The computer system of claim 10, the instructions further to:

filter the stored tracked activity based on at least one of:
an application;
a traffic class; or
a service; and
transmit the stored tracked activity or the filtered stored tracked activity to at least one of:
a user;
an analytics engine;
a machine learning model; or
a pattern recognition system.

17. The computer system of claim 10, the instructions further to:

obtain dynamic, real-time telemetry comprising performance data for a respective application;
identify a critical path associated with controlling performance of the respective application;
provide insight into how the respective application uses network resources by analyzing the stored tracked activity;
determine whether a reported bandwidth usage is associated with sending a steady stream of packets or sending a bursty stream of packets; and
determine whether a plurality of endpoints in a system exhibit the same or different behavior.

18. A non-transitory computer-readable medium storing instructions to:

track, in a network device with multiple links over which data is being communicated, activity over a respective link for a predetermined amount of time, the activity comprising at least one of a number of idle periods or a duration of a respective idle period;
partition a predetermined time interval into a number of bins, a respective bin associated with a range of time within the predetermined time interval;
store the tracked activity in data structure entries, a respective entry indicating the number of bins, a duration of time associated with a respective bin, and a count associated with the respective bin;
mark the tracked activity in the entry for the respective link by incrementing a count associated with a bin matching the duration of the respective idle period based on a first number of idle periods tracked for the matching duration; and
display the stored tracked activity for the respective link.

19. The non-transitory computer-readable medium of claim 18, the instructions further to perform at least one of:

track an amount of time or a number of cycles during which the link is idle by maintaining a first counter; or
track an amount of time or a number of cycles during which the link is active by maintaining a second counter, the activity further comprising at least one of a number of active periods or a duration of a respective active period, and the respective bin associated with a duration of the respective active period.

20. The non-transitory computer-readable medium of claim 18, the instructions further to:

filter the stored tracked activity based on at least one of an application, a traffic class, or a service; and display the stored tracked activity or the filtered stored tracked activity for the respective link as a histogram indicating the count of idle periods tracked for the duration of time associated with the respective bin.

* * * * *